(12) United States Patent  
Gaudieri (10) Patent No.: US 9,038,310 B2
(45) Date of Patent: May 26, 2015

(54) BALLAST WEIGHT FOR A FISHING LINE (76) Inventor: Gianni Gaudieri, Fiumicino (IT)

( * ) Notice: Subject to any disclaimer, the term of this patent is extended or adjusted under 35 U.S.C. 154(b) by 1 day.

(21) Appl. No.: 13/468,785

(22) Filed: May 10, 2012

(65) Prior Publication Data

US 2013/0298443 A1  Nov. 14, 2013

(51) Int. Cl.
*A01K 93/00* (2006.01)
*A01K 95/00* (2006.01)

(52) U.S. Cl.
CPC .................................. *A01K 95/00* (2013.01)

(58) Field of Classification Search
USPC ............... 43/44.9, 43.1, 43.12, 42.06, 42.35, 43/42.39
See application file for complete search history.

(56) References Cited

U.S. PATENT DOCUMENTS

| | | | |
|---|---|---|---|
| 2,611,988 A | 9/1952 | Gibson | |
| 3,744,174 A * | 7/1973 | Lund | 43/42.06 |
| 3,782,025 A * | 1/1974 | Kochevar | 43/44.9 |
| 3,895,455 A * | 7/1975 | Johnston | 43/17.6 |
| 3,896,580 A * | 7/1975 | Williams, Jr. | 43/42.31 |
| 4,098,017 A * | 7/1978 | Hall | 43/42.06 |
| 4,102,075 A * | 7/1978 | Wagner et al. | 43/17.1 |
| 4,250,650 A * | 2/1981 | Fima | 43/17.6 |
| 4,453,335 A * | 6/1984 | Smith | 43/42.31 |
| 4,477,996 A | 10/1984 | Walter | |
| 4,528,771 A * | 7/1985 | Rea, Jr. | 43/44.9 |
| 4,649,663 A * | 3/1987 | Strickland | 43/44.9 |
| 4,837,966 A | 6/1989 | Bethel | |
| 5,381,622 A * | 1/1995 | Tregre | 43/42.31 |
| 5,406,739 A | 4/1995 | Lu | |
| 5,649,384 A * | 7/1997 | Manning | 43/44.81 |
| 5,918,408 A * | 7/1999 | Laney | 43/43.13 |
| 6,035,574 A * | 3/2000 | Ware | 43/42.06 |
| 7,861,457 B2 * | 1/2011 | Blette et al. | 43/44.9 |
| 2002/0178646 A1 | 12/2002 | Ratte | |
| 2002/0189317 A1 | 12/2002 | Ratte | |
| 2003/0159331 A1* | 8/2003 | Pasley | 43/44.9 |
| 2008/0066369 A1* | 3/2008 | Walter | 43/44.9 |
| 2012/0073183 A1* | 3/2012 | Kissee | 43/43.14 |

* cited by examiner

*Primary Examiner* — Christopher P Ellis
*Assistant Examiner* — Jessica Wong
(74) *Attorney, Agent, or Firm* — Pearne & Gordon LLP (57) ABSTRACT

A ballast weight for a fishing line, comprising a main body (1) destined to be associated to a fishing line, which comprises a through-channel (10) provided with an inlet opening (11) and an outlet opening (12) located on the external surface of the main body (1), said through-channel (10) being overall orientated in a parallel direction to a longitudinal axis (x) of the main body (1) and being provided with a progression and a breadth that are variable.

22 Claims, 6 Drawing Sheets

BALLAST WEIGHT FOR A FISHING LINE

FIELD OF THE INVENTION

The present invention relates to a ballast weight for a fishing line.

The ballast weight of the present invention is particularly, but not exclusively, suitable for performing long casts in shore fishing.

BACKGROUND OF THE INVENTION

Performing a long cast requires use of a ballast weight of relatively high weight, on average about 50-200 grams, associated to a end portion of the fishing line used.

The ballast weights at present available exhibit various conformations, more or less elongate or spherical, but are all characterised by a certain instability during the flight stage thereof. This means that the ballast weights at present available take on a flight trim that is characterised by a relatively high coefficient CX, which in practice prevents any casts of more than 100 meters from being attained.

SUMMARY OF THE INVENTION

The aim of the present invention is to provide a ballast weight for a fishing line which obviates the drawbacks of the ballast weights of known type.

An advantage of the ballast weight of the present invention is that it is extremely stable during the flight stage.

A further advantage of the ballast weight of the present invention is that it exhibits a particularly aerodynamic shape.

A further advantage of the ballast weight of the present invention is that it is provided with a considerably greater weight than known-type ballast weights.

BRIEF DESCRIPTION OF THE DRAWINGS

Further characteristics and advantages of the present invention will more fully emerge from the following description, provided by way of non-limiting example, of a preferred but not exclusive embodiment of the invention, made in the following with reference to the accompanying drawings, in which.

DETAILED DESCRIPTION OF THE INVENTION

With reference to the above-cited figures, the ballast weight of the present invention comprises a main body 1 that is destined to be associated to a ballast weight for fishing. The main body 1 is normally made of lead, but might also be made of other metals or metal alloys, or other materials besides, such as wood, plastic, rubber or glass; it may also be made of a layered combination of some of the above. The main body 1 comprises a front portion 2 having a tapered shape which terminate in an apex that is more or less sharply pointed. The main body 1 further comprises a rear portion 3 on which, at a tail end of the main body 1, an eyelet 7 is fashioned to enable connection of the main body 1 to a ballast weight. The thickness of the eyelet 7 is comprised, by way of indication, between 0.8 and 1 mm.

Figures 16, 19:
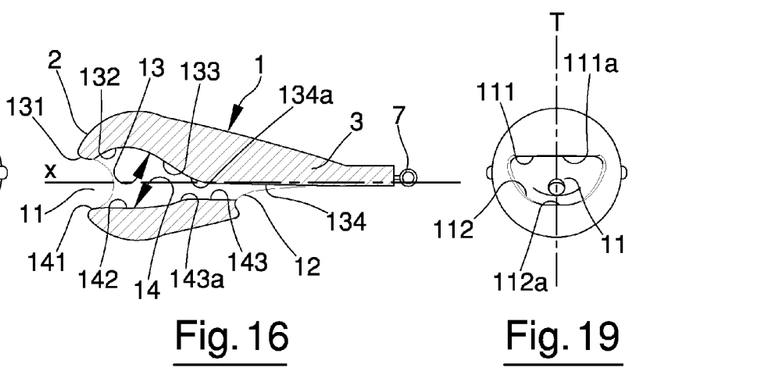
FIGS. 16 to 20 respectively illustrate a section view performed according to the median longitudinal plane A, a view from below, a view from above, a front view and a rear view of a fourth embodiment of the ballast weight of the present invention.
Figure 17:
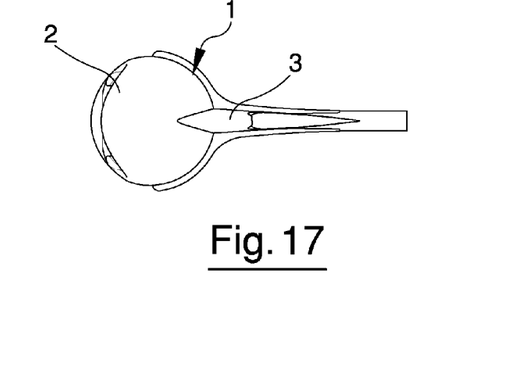
Figure 18:
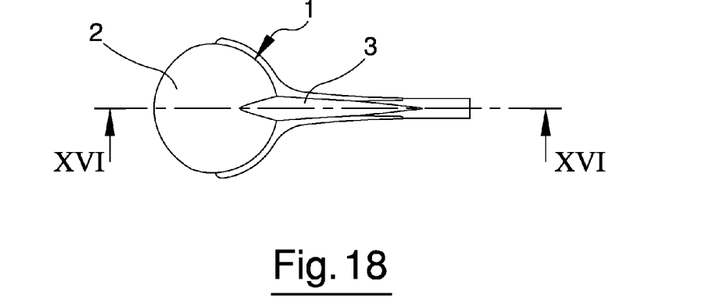
Figure 20:
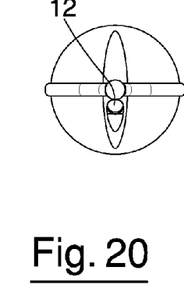
Figure 21:
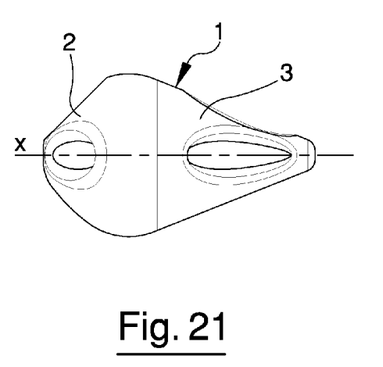
FIGS. 21 to 25 respectively illustrate a section view performed according to the median longitudinal plane A, a view from below, a view from above, a front view and a rear view of a fifth embodiment of the ballast weight of the present invention.
Figure 22:
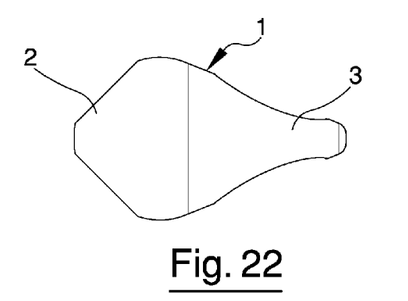
Figure 23:
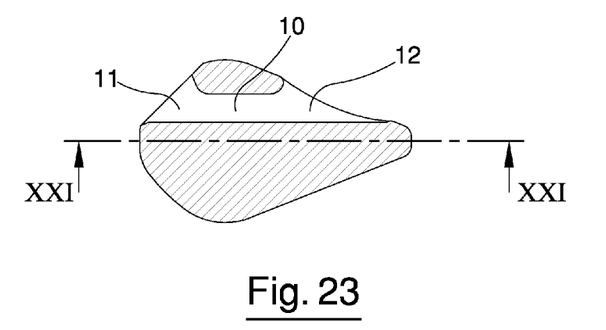
Figure 24:
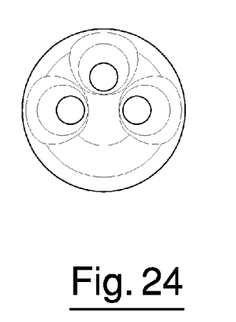
Figure 25:
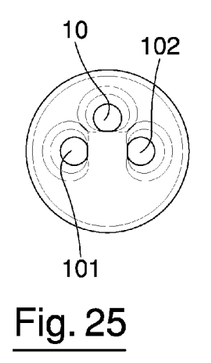

The main body 1 preferably exhibits an elongate shape, oval or tear-shaped, provided with a longitudinal axis x (FIGS. 1, 6, 11, 21). Alternatively the main body 1 could comprise a front portion 2 having a spherical shape, joined to an elongate rear portion 3 (FIG. 16). The more elongate shapes are useful for increasing the length of the cast, while spherical or less elongate shapes favour stability of the ballast weight on the sea bottom.

The main body 1 further comprises a through-channel 10 provided with an inlet opening 11 and an outlet opening 12 located on the external surface of the main body 1, respectively on the front portion 2 and the rear portion 3 of the main body 1. Overall the through-channel 10 is orientated in a parallel direction to the longitudinal axis x and exhibits a progression and size that are variable and favour penetration of the ballast weight into the air during the flight thereof.

Figure 2:
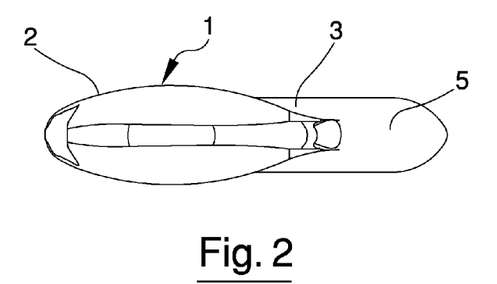
Figures 6, 9, 10:
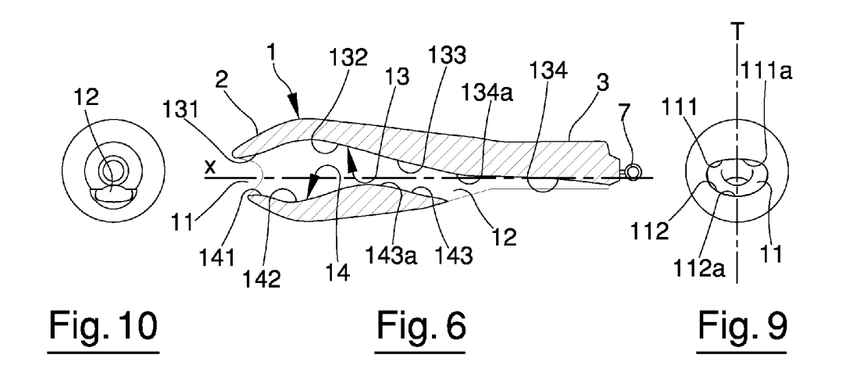
FIGS. 6 to 10 respectively illustrate a section view performed according to the median longitudinal plane A, a view from below, a view from above, a front view and a rear view of a second embodiment of the ballast weight of the present invention.
Figure 7:
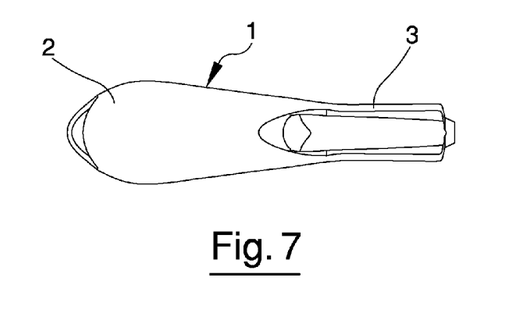
Figure 8:
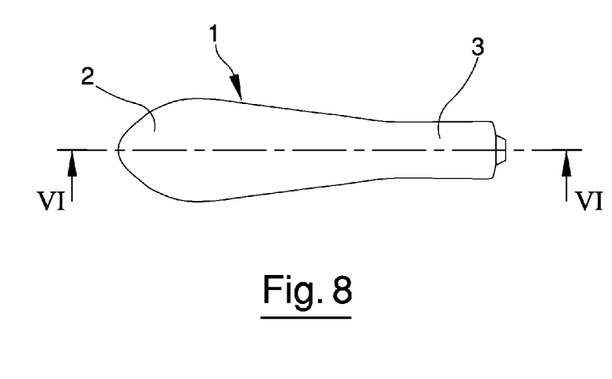
Figures 11, 14:
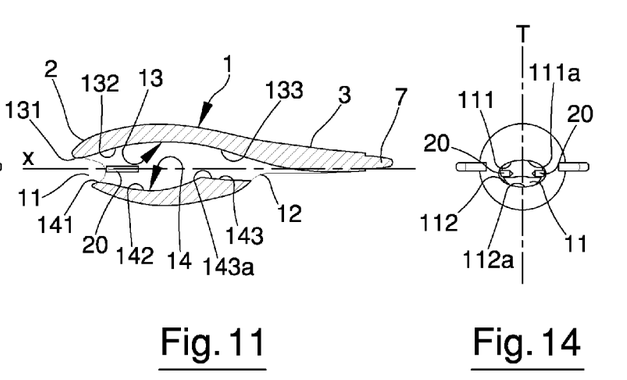
FIGS. 11 to 15 respectively illustrate a section view performed according to the median longitudinal plane A, a view from below, a view from above, a front view and a rear view of a third embodiment of the ballast weight of the present invention.
Figure 12:
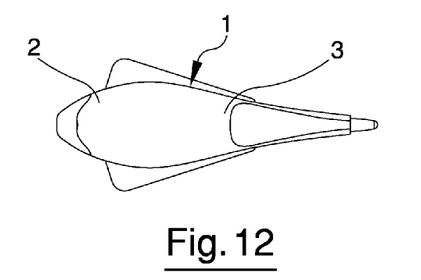
Figure 13:
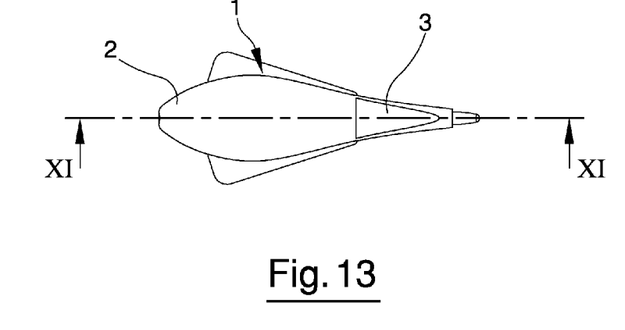
Figure 15:
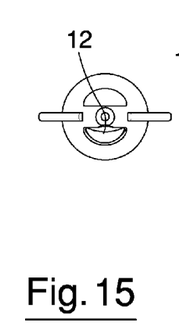

The through-channel 10 preferably exhibits, on a vertical longitudinal section plane containing the longitudinal axis x, an upper profile 13 having a curved extension. The upper profile comprises a first tract 131, arranged in proximity of the inlet opening 11, which exhibits a convex development. The upper profile comprises a first tract 131, arranged in proximity of the inlet opening 11, which exhibits a convex development. The upper profile 13 further comprising a second tract 132, connected to the first tract 131, which exhibits a concave development and, in the embodiment shown in FIG. 2, terminates at the outlet opening 12. In the alternative embodiments, a third tract 133 of the upper profile 13 can be arranged consecutively to the second tract 132 before the outlet opening 12. The third tract 133 can develop substantially straight and parallel to the longitudinal axis X, as shown in FIG. 16, or, as shown in FIG. 6 and FIG. 11, can exhibit a declining progression. In the last described embodiment, the third tract 133, before reaching the outlet opening 12, can be profiled with a end tract 134 that is straight or slightly concave. The end tract 134 is connected to the third tract 133 at a projecting loop 134a. The presence of the end tract 134, together with the presence of the projecting loop 134a, considerably amplifies the bearing effect produced by the through-channel 10.

On the same vertical section plane, the through-channel 10 exhibits a lower profile 14 having a curved progression. The lower profile 14 comprises a first tract 141, arranged in proximity of the inlet opening 11, which exhibits a convex development and a second tract 142, connected to the first tract 141, which exhibits a concave development and, in the embodiment shown in FIG. 2, terminates at the outlet opening 12. In the alternative embodiments, a third tract 143 of the upper profile 13 can be arranged consecutively to the second tract 142 before the outlet opening 12. The third tract 143 can develop substantially straight and parallel to the longitudinal axis X, as shown in FIG. 11 and FIG. 16, or, as shown in FIG. 6, can exhibit a declining progression. In the last embodiment described, the third tract 143 is connected to the second tract 142 by means of a convex loop 143a. The presence of the third tract 143, together with the presence of the convex loop 143a, considerably amplifies the bearing effect produced by the through-channel 10.

Figures 1, 5:
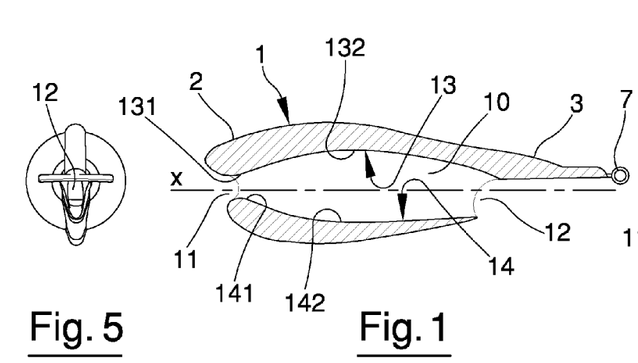
FIGS. 1 to 5 respectively illustrate a section view performed according to the median longitudinal plane A, a view from below, a view from above, a front view and a rear view of a first embodiment of the ballast weight of the present invention.

As is visible in FIG. 1, the through-channel 10 substantially exhibits a first entry portion, delimited by the first tract 131 of the upper profile 13 and by the first tract 141 of the lower profile 14, which is substantially converging in a direction proceeding towards the inlet opening 11 towards the inside of the through-channel 10. A second portion of the through-channel 10 is connected to the entry portion and is delimited overall by the second tract 132 of the upper profile 13 and the second tract 142 of the lower profile 14. As the second tracts 132, 142 of the upper profile 13 and the lower profile 14 exhibit a concave development, the second portion of the through-channel 10 has a progression that first diverges, from the connecting zone with the entry tract up to a central section of maximum size, and thereafter a progression that converges. In the solutions illustrated in FIGS. 6, 11, 16, the through-channel 10 exhibits also a end portion delimiting the third tract 133 of the upper profile 13 and the third tract 143 of the lower profile 14.

The presence and the morphological characteristics of the profile of the through-channel 10 offer important advantages. During the flight stage of the ballast weight there is created, along the through-channel 10, a flow of air that facilitates the flight of the ballast weight and, consequently, considerably increases the length of the cast of the ballast weight.

In the illustrated embodiment of FIGS. 21 to 25, the main body 1, which exhibits a tear shape, relatively squat and provided with a front section that is bigger than the main body 1 of the ballast weights described up to this point, is provided with three through-channels 10, 101, 102 substantially parallel to one another which further amplify the effects described for the preceding embodiments. In a further embodiment of the ballast weight, the three through-channels 10, 101, 102 can develop with a helical progression about the longitudinal axis X of the main body 1. The latter conformation of the through-channels 10, 101, 102 enables impressing on the ballast weight, during the flight stage thereof, a rotary motion about the longitudinal axis X which favours the stability and trim of the ballast weight itself, and contributes to further increasing the casting distance.

Figure 27:
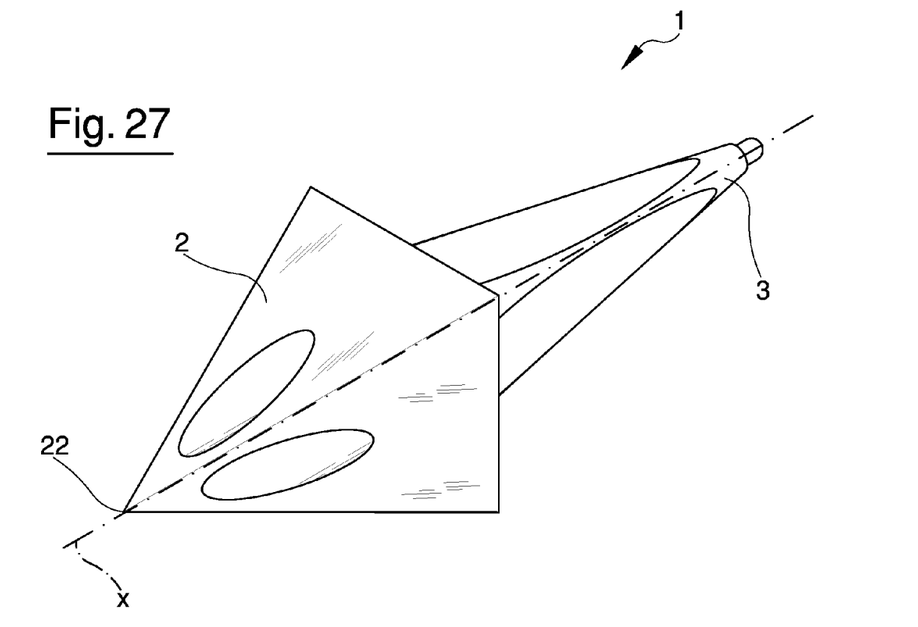

The presence of three or four through-channels, substantially parallel to one another and especially advantageous also in a further embodiment of the ballast weight, illustrated in FIG. 27, in which the main body 1 exhibits a front portion having a pyramidal shape with a vertex facing forwards. Each of the through-channels exhibits an inlet opening arranged on one of the faces of the pyramid, three or four according to whether the pyramid is square or triangular. The outlet opening of each channel is, differently, arranged on the base of the pyramid.

Particularly in the last embodiment of the ballast weight and the embodiment illustrated in FIGS. 21 to 25, but also in all the remaining embodiments of the ballast weight, the main body 1 can be provided with a frontal point 22. The frontal point 22 can be removably associated to the main body 1, for example by means of a threaded portion. The frontal point 22 projects forwards from the front portion 2 of the main body 1, such as to further facilitate the aerodynamic penetration of the ballast weight during the flight stage thereof. The shape of the frontal point 22 can be more or less sharp and is such as to be able to connect in a predetermined way to the main body 1.

Figure 26:
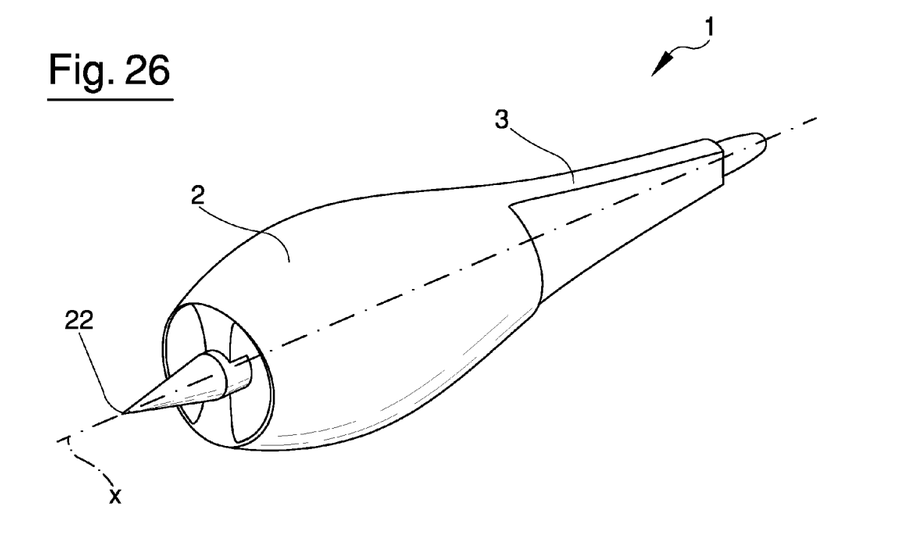
FIGS. 26 and 27 show two further embodiments of the ballast weight.

A further embodiment of the ballast weight is illustrated in FIG. 26. In this variant, the main body 1 is provided with two flanked through-channels 10, 101 that develop with a mutually parallel progression. A frontal point 22 can be applied on the front portion 2, in an intermediate position between the two through-channels 10, 101.

In order to further increase the effects produced by the through-channel 10, the through-channel 10 can be provided internally with shaped tabs 20. The shaped tabs 20 project from the surface of the through-channel 10 towards the inside of the channel. For example, two shaped tabs 20 can be provided, located in opposite positions on a same horizontal plane, as shown in the embodiment of FIG. 11. A further two shaped tabs 20 might be located in a perpendicular plane to the preceding one, again in opposite positions. The shaped tabs 20 can have a flat or helical development, the helical development being useful for impressing on the ballast weight a rotation about its own longitudinal axis. The shaped tabs 20 can obviously be predisposed on all the illustrated embodiments.

Figure 3:
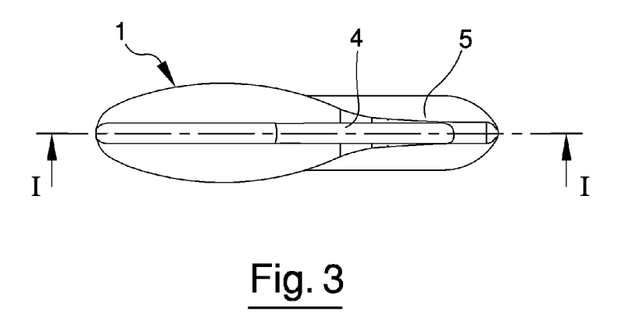
Figure 4:
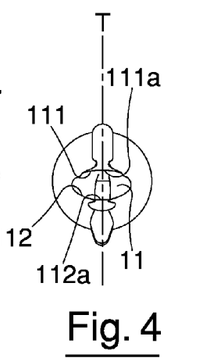

To increase the flow rate of air through the through-channel 10, the inlet opening 11 of the through-channel 10 exhibits, on a frontal projection plane, a outline provided with an upper tract 111 which can have a concave development or a convex central portion. On the same projection plane, the inlet opening 11 of the through-channel 10 preferably exhibits a outline provided with a lower tract 112 preferably having a concave development. The lower tract could however be at least partly convex. The upper tract 111 and the lower tract 112 further intersect the median vertical longitudinal plane of the section I illustrated in FIG. 3, at the respective mid-points 111a, 112a. The mid-points 111a, 112a are on different transversal vertical planes. In particular, the mid-point 111a of the upper tract 111 is on a transversal vertical plane that is more advanced with respect to the mid-point 112a of the lower tract 112. This means that overall the inlet opening 11 is inclined and faces downwards, facilitating the flow of air along the channel 10 during the flight stage of the ballast weight.

To further increase the effect produced by the air flow, the outlet opening 12 of the through-channel 10 exhibits, on a frontal projection plane, an oval development outline. The outlet opening 12 can advantageously be provided also with a mobile plate, rotatably constrained to the outline of the outlet opening 12 about a transversal axis. The mobile plate, not illustrated, is free to rotate idle between a closing position, in which it occludes the outlet opening 12, and an opening position, in which it does not occlude the outlet opening 12. The mobile plate is brought into the opening position by effect of the thrust produced by the air flow through the through-channel 10. When on the other hand the ballast weight is on the fishing ground, the mobile plate is brought into the closing position by effect of the thrust produced by sand or other sediment which tends to enter the outlet opening 12.

To facilitate entry of air into the through-channel 10, as well as for facilitating the penetration of the air of the ballast weight, the main body 1 is preferably structured such that the centre of gravity thereof is in a lower zone of the main body. For this purpose, a weighting rib can be arranged below the main body 1.

To increase the in-flight stability of the ballast weight, the main body 1 is provided with at least a first stabilising wing 4, arranged preferably in an end zone of the rear portion 3 of the main body 1. The first stabilising wing 4 preferably develops mainly on a horizontal plane. A second stabilising wing 5, which develops mainly on a vertical plane, can be arranged in proximity of the first wing 4. The presence of the first and second stabilising wing give the ballast weight a very high degree of stability and directionality during the flight. The stabilising wings 4, 5 can be solidal with the main body 1, or can be fixed removably to the main body 1, for example by means of screws, such that it is possible to choose the number and position of the wings as desired. The stabilising wings 4, 5 can have a flat or helical development, which is useful for impressing a rotation of the ballast weight about the longitudinal axis thereof.

A further useful detail for improving the aerodynamic characteristics of the ballast weight can be to realise on the external surface of the ballast weight one or more annular grooves, arranged concentrically of the longitudinal axis of the main body of the ballast weight. The annular grooves, not illustrated, are preferably provided, on a section plane containing the longitudinal axis of the main body, of a curved profile.

The invention claimed is:

1. A ballast weight for a fishing line, comprising a main body (1) destined to be connected, during use, to the fishing line, which main body (1) comprises a front portion (2) and a rear portion (3) on which, at a tail end of the main body (1), an eyelet (7) is provided to enable connection of the main body (1) to the fishing line, characterised in that the main body comprises a through-channel (10) provided with an inlet opening (11) and one and only one outlet opening (12) located on the external surface of the main body (1), said through-channel (10) being overall orientated in a parallel direction to a longitudinal axis (x) of the main body (1) and being provided with a progression and a breadth that are variable, said through-channel (10) being structured such that, during a flight stage of the ballast weight, (a) the fishing line is attached to the eyelet (7) and the fishing line does not pass through the through-channel (10) and (b) there is created through an entire length of the through-channel (10) an effective flow of air that facilitates the flight of the ballast weight, the morphological characteristics of the profile of the through-channel (10) being such that, during the flight stage of the ballast weight there is created, through the entire length of the through-channel (10), an effective flow of air, the main body being free from the presence of a fish hook.

2. The ballast weight according to claim 1, wherein said through-channel (10) exhibits, on a longitudinal vertical section plane, an upper profile (13) which comprises a first tract (131), arranged in proximity of the inlet opening (11), which exhibits a convex development.

3. The ballast weight of claim 2, wherein said upper profile (13) of the through-channel (10) exhibits a second tract (132), connected to the first tract (131), which second tract (132) exhibits a concave development and terminates at the outlet opening (12).

4. The ballast weight of claim 3, wherein said upper profile (13) of the through-channel (10) exhibits a third tract (133) arranged consecutively to the second tract (132), which third tract (133) exhibits a progression that is substantially straight and parallel to the longitudinal axis (X).

5. The ballast weight of claim 3, wherein said upper profile (13) of the through-channel (10) exhibits a third tract (133) arranged consecutively to the second tract (132), which third tract (133) exhibits a declining progression.

6. The ballast weight of claim 5, wherein said third tract (133) comprises an end tract (134) that is straight or slightly concave and which is connected to the third tract (133) at a projecting loop (134a).

7. The ballast weight of claim 1, wherein said through-channel (10) exhibits, on a vertical longitudinal section plane, a lower profile (14) which comprises a first tract (141), arranged in proximity of the inlet opening (11), which exhibits a convex development.

8. The ballast weight of claim 7, wherein said lower profile (14) of the through-channel (10) comprises a second tract (142), connected to the first tract (141), which exhibits a concave development and terminates at the outlet opening (12).

9. The ballast weight of claim 8, wherein said lower profile (14) of the through-channel (10) comprises a third tract (143) arranged consecutively to the second tract (142) which third tract (143) exhibits a progression that is substantially straight and parallel to the longitudinal axis (X).

10. The ballast weight of claim 8, wherein said lower profile (14) of the through-channel (10) comprises a third tract (143) arranged consecutively to the second tract (142) which third tract (143) exhibits a declining progression and which is connected to the second tract (142) by means of a convex loop (143a).

11. The ballast weight of claim 1, wherein the through-channel (10) is internally provided with shaped tabs (20).

12. The ballast weight of claim 4, wherein an upper tract (111) and a lower tract (112) intersect a vertical longitudinal mid-section plane at respective mid-points (111a, 112a) that lie on distinct vertical transversal planes, said mid-point (111a) of the upper tract (111) lying on a vertical transversal plane that is more advanced with respect to the mid-point (112a) of the lower tract (112).

13. The ballast weight of claim 1, wherein the outlet opening (12) of the through-channel (10) exhibits, on a frontal projection plane, an oval outline.

14. The ballast weight of claim 13, wherein the outlet opening (12) is provided with a mobile plate, rotatably constrained to the outline of the outlet opening (12) about a transversal axis, which mobile plate is free to rotate idle between a closed position, in which it occludes the outlet opening (12) and an open position, in which it does not occlude the outlet opening (12).

15. The ballast weight of claim 1, wherein the main body (1) is provided with at least a stabilising wing (4) which projects from the main body (1) in an external direction.

16. The ballast weight of claim 1, wherein the main body (1) is provided with a frontal point (22) which projects forward of the front portion (2) of the main body (1).

17. The ballast weight of claim 1, comprising two flanked through-channels (10, 101) which develop with a reciprocally parallel progression.

18. The ballast weight of claim 1, comprising three through-channels (10, 101, 102) which develop with a parallel or helical progression about the longitudinal axis (X).

19. The ballast weight of claim 5, wherein an upper tract (111) and a lower tract (112) intersect a vertical longitudinal mid-section plane at respective mid-points (111a, 112a) that lie on distinct vertical transversal planes, said mid-point (111a) of the upper tract (111) lying on a vertical transversal plane that is more advanced with respect to the mid-point (112a) of the lower tract (112).

20. The ballast weight of claim 1, wherein said through-channel (10) exhibits, on a longitudinal vertical section plane, an upper profile (13) and a lower profile (14), wherein, along a central tract of the upper profile (13), a distance from the lower profile (14) to the upper profile (13) is greater than (a) a distance from the upper profile (13) to a top of the main body (1) plus (b) a distance from the lower profile (14) to a bottom of the main body (1).

21. The ballast weight of claim 1, wherein the through-channel (10) is defined by a perimeter wall, the through-channel (10) having a central, empty, portion running longitudinally through a center of a cross sectional area of the through-channel (10), the central portion being unobstructed during the flight stage of the ballast weight.

22. The ballast weight of claim 1, wherein the through-channel (10) is defined by a perimeter wall, a volume defined by the perimeter wall being empty during the flight stage of the ballast weight.

* * * * *